United States Patent
Saneto et al.

(10) Patent No.: US 11,194,169 B2
(45) Date of Patent: Dec. 7, 2021

(54) LIGHT DIFFRACTION FILM AND WEARABLE DISPLAY DEVICE

(71) Applicant: FUJIFILM Corporation, Tokyo (JP)

(72) Inventors: Ryuji Saneto, Minami-Ashigara (JP); Shuntaro Ibuki, Minami-Ashigara (JP); Yoji Ito, Minami-Ashigara (JP); Mitsuo Osato, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

(21) Appl. No.: 16/673,214

(22) Filed: Nov. 4, 2019

(65) Prior Publication Data

US 2020/0064647 A1 Feb. 27, 2020

Related U.S. Application Data (63) Continuation of application No. PCT/JP2018/019396, filed on May 18, 2018.

(30) Foreign Application Priority Data

May 19, 2017 (JP) .............................. JP2017-100048
Oct. 18, 2017 (JP) .............................. JP2017-201894

(51) Int. Cl.
    *G02B 27/42* (2006.01)
    *G02B 27/00* (2006.01)
    *G02B 27/01* (2006.01)

(52) U.S. Cl.
    CPC ..... *G02B 27/4205* (2013.01); *G02B 27/0037* (2013.01); *G02B 27/0172* (2013.01); *G02B 2027/0178* (2013.01)

(58) Field of Classification Search
CPC .. G02B 5/0215; G02B 5/0226; G02B 5/0242; G02B 5/0252; G02B 27/4205; G02B 27/0037; G02B 27/0172; G02B 2027/0178; G02B 27/1066; G02B 5/1814; G02B 5/1866; G02B 5/021; G02B 5/0278; G02B 27/4272
See application file for complete search history.

(56) References Cited

U.S. PATENT DOCUMENTS

2008/0037261 A1  2/2008  Chari et al.
2010/0053756 A1\*  3/2010  Asakura ............... G02B 5/0278
                                                        359/580
(Continued)

FOREIGN PATENT DOCUMENTS

JP        8-166556 A    6/1996
JP        2008-3246 A    1/2008
(Continued)

OTHER PUBLICATIONS

Machine translation of JPH08-166556 (Year: 1996).*
(Continued)

*Primary Examiner* — Kimberly N. Kakalec
(74) *Attorney, Agent, or Firm* — Birch, Stewart, Kolasch & Birch, LLP (57) ABSTRACT

A light diffraction film includes a transparent substrate; and a light diffraction layer containing a binder resin and particles, in which an average primary particle diameter of the particles is 1 μm to 10 μm, and a coverage of a surface of the transparent substrate covered with the particles is 70% to 90%.

14 Claims, 1 Drawing Sheet

(56) References Cited

U.S. PATENT DOCUMENTS

2014/0049822 A1* 2/2014 Gollier .................. G02B 5/021
359/488.01
2018/0275398 A1 9/2018 Kikuchi et al.

FOREIGN PATENT DOCUMENTS

JP  2008-52273 A   3/2008
JP  2016-139112 A  8/2016

OTHER PUBLICATIONS

Japanese Office Action for Japanese Application No. 2019-518902, dated Mar. 2, 2021, with English translation.
International Preliminary Report on Patentability and Written Opinion of the International Searching Authority, dated Nov. 28, 2019, for International Application No. PCT/JP2018/019396, with an English translation of the Written Opinion.
International Search Report, dated Aug. 21, 2018, for International Application No. PCT/JP2018/019396, with an English translation.
Japanese Office Action, dated May 19, 2020, for Japanese Application No. 2019-518902, with an English machine translation.
Japanese Office Action for corresponding Japanese Application No. 2019-518902, dated May 31, 2021, with English translation.

* cited by examiner

LIGHT DIFFRACTION FILM AND WEARABLE DISPLAY DEVICE

CROSS REFERENCE TO RELATED APPLICATION

This is a continuation of International Application No. PCT/JP2018/019396 filed on May 18, 2018, and claims priorities from Japanese Patent Application No. 2017-100048 filed on May 19, 2017 and Japanese Patent Application No. 2017-201894 filed on Oct. 18, 2017, the entire disclosures of which are incorporated herein by reference.

BACKGROUND OF THE INVENTION

1. Field of the Invention

The present invention relates to a light diffraction film and a wearable display device. More specifically, the present invention relates to a technique for improving a problem of a pixel grid visually recognized in a wearable display.

2. Description of the Related Art

A Wearable display mounted on the head such as a head-mounted display or a see-through eyewear-type display adopts a magnifying optical system such as a lens or a diffractive optical element such that an image display portion is observed in a magnified state. For example, in the head-mounted display, the image display portion is observed through an optical lens with a high curvature, which enables a user to enjoy a realistic wide-view video.

Because the video in the image display portion is observed by being magnified at a wide view angle, unfortunately, a pixel grid is magnified and visually recognized. Regarding this problem, JP2016-139112A suggests a technique for improving the visibility of a pixel grid by using an optical low-pass filter using a microlens array sheet, an anti-glare sheet, a birefringent element, and the like.

SUMMARY OF THE INVENTION

With the conventional method using a microlens array sheet or an anti-glare sheet, the problem of the pixel grid which is easily visually recognized can be improved, but unfortunately, image clearness deteriorates. Furthermore, in a case where a film such as the anti-glare sheet in which surface asperities are irregularly arranged is used, unfortunately, glare occurs on images.

The present invention has been made to solve the above problems, and an object thereof is to provide a light diffraction film, which prevents a pixel grid from being easily visually recognized in a wearable display using a magnifying optical system, brings about high image clearness, and hardly causes glare, and a wearable display device.

As a result of repeating intensive examinations, the inventors of the present invention have found that the above problems can be solved by the following means.

<1> A light diffraction film having a transparent substrate and a light diffraction layer containing a binder resin and particles, in which an average primary particle diameter of the particles is 1 µm to 10 µm, and a coverage of a surface of the transparent substrate covered with the particles is 70% to 90%.

<2> The light diffraction film described in <1>, in which in the light diffraction layer, the number of the particles present in a direction orthogonal to the surface of the transparent substrate is not plural.

<3> The light diffraction film described in <1> or <2>, in which the particles are arranged in an in-plane direction of the light diffraction layer, and provided that the number of the particles in a range of 100 µm×100 µm is Np, an average primary particle diameter of the particles is Dp µm, and a distance between nearest particles is Lp µm, a particle regularity represented by the following equation is equal to or higher than 30%.

Regular arrangement distance $Li = (4/\sqrt{3} \times 10,000/2/Np)^{(1/2)}$

Particle regularity $= (Lp-Dp)/(Li-Dp)$

<4> The light diffraction film described in any one of <1> to <3>, in which provided that a refractive index of the particles is np and a refractive index of the binder resin is nb, a refractive index ratio nb/np is equal to or higher than 1.03 and equal to or lower than 1.09.

<5> The light diffraction film described in any one of <1> to <4>, in which a height h of the binder resin is equal to or greater than 70% and equal to or smaller than 300% of the average primary particle diameter of the particles.

<6> A wearable display device including the light diffraction film described in any one of <1> to <5>.

<7> The wearable display device described in <6> further including a display and a lens.

<8> The wearable display device described in <6> further including a display and a diffractive optical element.

According to the present invention, it is possible to provide a light diffraction film, which prevents a pixel grid from being easily visually recognized even in a wearable display using a magnifying optical system, brings about high image clearness, and hardly causes glare, and a wearable display device.

DESCRIPTION OF THE PREFERRED EMBODIMENTS

Hereinafter, aspects of preferred embodiments according to the present invention will be specifically described. In the following section, constituents will be described based on typical embodiments of the present invention in some cases, but the present invention is not limited to the embodiments.

In the present specification, in a case where a range of numerical values is expressed using a description of "(numerical value 1) to (numerical value 2)", the description means "equal to or greater than (numerical value 1) and equal to or smaller than (numerical value 2)".

Furthermore. "(meth)acrylate" represents at least one kind of compound between acrylate and methacrylate, "(meth)acryl" represents at least one kind of compound between acryl and methacryl, and "(meth)acryloyl" represents at least one kind of compound between acryloyl and methacryloyl.

[Light Diffraction Film]

The light diffraction film according to an embodiment of the present invention has a transparent substrate and a light diffraction layer containing a binder resin and particles, in which an average primary particle diameter of the particles is 1 μm to 10 μm, and a coverage of a surface of the transparent substrate covered with the particles is 70% to 90%.

The light diffraction film according to the embodiment of the present invention is capable of diffracting light. In a case where the light diffraction film according to the embodiment of the present invention is used, it is possible to provide a wearable display device in which a pixel grid is not easily visually recognized, images have high clearness, and glare hardly occurs. Specifically, for example, in a head-mounted display having an image display portion and a lens which is a magnifying optical system, in a case where the light diffraction film according to the embodiment of the present invention is disposed on the surface of the image display portion, it is possible to manufacture a head-mounted display device in which a pixel grid is not easily visually recognized, images have high clearness, and glare hardly occurs. For another example, in an eyewear-type display device having an image display portion, a light guide portion, and a diffractive optical element, in a case where the light diffraction film according to the embodiment of the present invention is disposed on the surface of the image display portion, it is possible to manufacture an eyewear-type display device in which a pixel grid is not easily visually recognized, images have high clearness, and glare hardly occurs.

Constituents of the light diffraction film according to the embodiment of the present invention will be specifically described with reference to FIG. 1.

Figure 1:
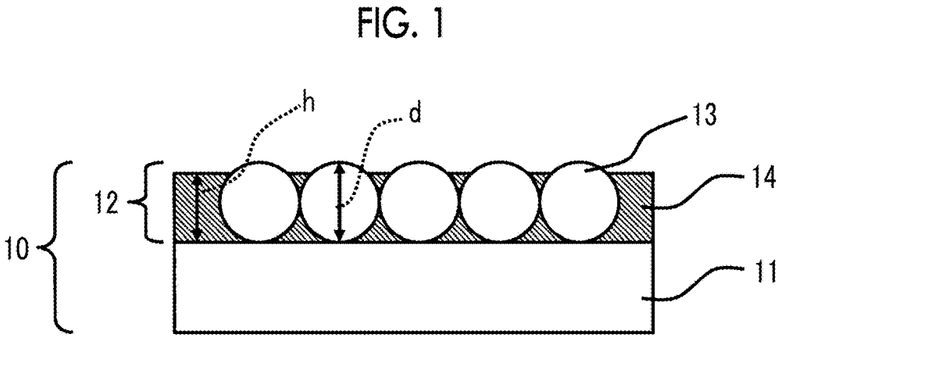
FIG. 1 a schematic cross-sectional view of an embodiment of a light diffraction film of the present invention.

FIG. 1 shows an example of the light diffraction film according to the embodiment of the present invention. As shown in FIG. 1, a light diffraction film 10 has a structure in which a light diffraction layer 12 containing a binder resin 14 and particles 13 is laminated on a transparent substrate 11.

Figure 2:
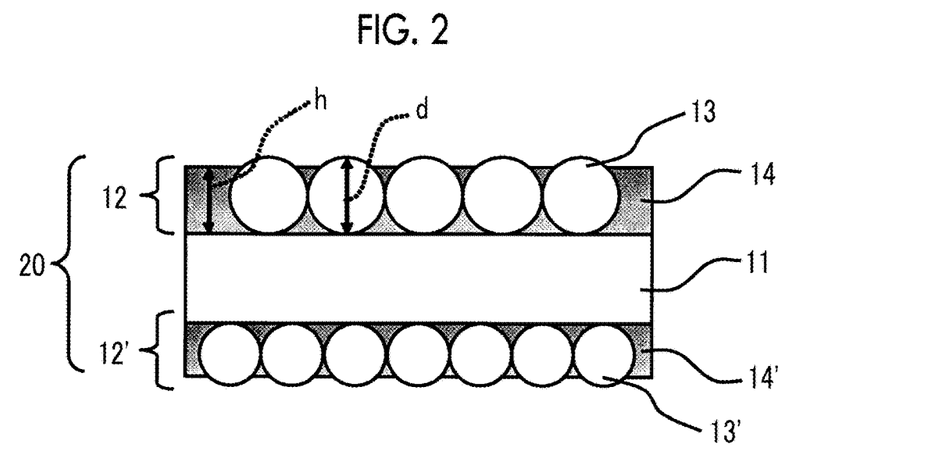
FIG. 2 is a schematic cross-sectional view of another embodiment of the light diffraction film of the present invention.

FIG. 2 shows another example of the light diffraction film according to the embodiment of the present invention. As shown in FIG. 2, a light diffraction film 20 has a structure in which the light diffraction layer 12 containing the binder resin 14 and the particles 13 and a light diffraction layer 12' containing a binder resin 14' and particles 13' are laminated on both surfaces of the transparent substrate 11. In this case, in view of optical design, the period of the light diffraction layer 12 is preferably different from the period of the light diffraction layer 12', that is, the particle diameter of the particles 13 is preferably different from the particle diameter of the particles 13', and the particle diameter of the particles 13' is preferably smaller than the particle diameter of the particles 13.

Figure 3:
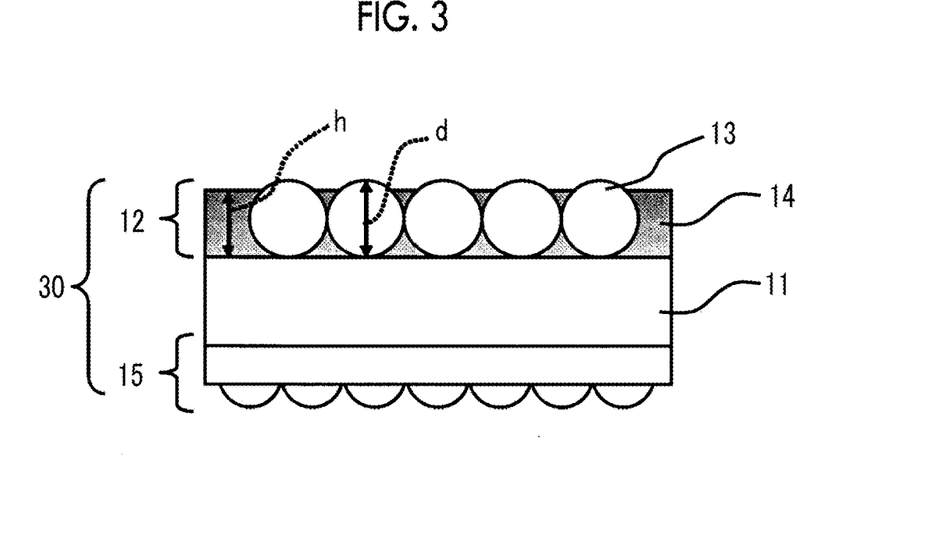
FIG. 3 is a schematic cross-sectional view of still another embodiment of the light diffraction film of the present invention.

FIG. 3 shows another example of the light diffraction film according to the embodiment of the present invention. As shown in FIG. 3, a light diffraction film 30 may have a structure in which the light diffraction layer 12 containing the binder resin 14 and the particles 13 is laminated on one surface of the transparent substrate 11, and may include a microlens array 15 on a side opposite to the light diffraction layer. In this case, likewise, in view of optical design, it is preferable that the period of the microlens array is different from the period of the light diffraction layer according to the embodiment of the present invention because then anisotropy can be imparted.

In the light diffraction film according to the embodiment of the present invention, a coverage of the light diffraction layer covered with the particles is preferably equal to or higher than 70% and equal to or lower than 90%. "Coverage" means a ratio of an area covered with the particles to a surface area. More specifically, in the present invention, "coverage" refers to a ratio of a sum $S_2$ of projected areas of the particles in the light diffraction layer to an area $S_1$ of a surface of the transparent substrate ($100 \times S_2/S_1$) that is determined in a case where the light diffraction layer is seen in a direction orthogonal to the surface of the transparent substrate. In a case where the coverage is higher than 90%, the particles are superposed in a thickness direction, and glaring worsens. In a case where the coverage is lower than 70%, the periodicity deteriorates, and hence the primary diffraction intensity is reduced. Consequently, the effect of improving the problem of the pixel grid visually recognized is reduced.

As described above, in the light diffraction layer of the light diffraction film according to the embodiment of the present invention, it is preferable that the number of particles present in a direction orthogonal to the surface of the transparent substrate is not plural (that is, it is preferable that the particles are not superposed in a film thickness direction).

The coverage can be controlled by a volume ratio between the binder resin and particles in the light diffraction layer and a thickness of the light diffraction layer. Accordingly, it is important to appropriately design a mixing ratio between the binder resin and the particles and a coating amount of a composition for forming a light diffraction layer at the time of forming the light diffraction layer.

The light diffraction film according to the embodiment of the present invention can be used in an image display portion of a wearable display. It is considered that the problem of the pixel grid visually recognized could be improved using conventionally known microlens array sheets or anti-glare sheets. However, because the microlens array sheet generates lots of high-order light diffraction components for incident light incoming from the front, pixels blur, spread, and are visually recognized. It is considered that accordingly, it is difficult to maintain image clearness. Furthermore, because surface asperities are randomly formed in the anti-glare sheet, uneven refraction occurs in pixel arrangement. It is considered that as a result, a problem called glare, which occurs in a case where the unevenly refracted light is visually recognized as unevenness of brightness or color, may easily arise.

In contrast, in the present invention, regular particle arrangement is adopted as a light diffraction mechanism, and a refractive index difference between particles and a binder resin is set to be an appropriate value. As a result, it is possible to reduce a proportion of high-order diffraction light by increasing a proportion of primary diffraction light while obtaining a sufficiently high light diffraction efficiency. It is considered that due to these characteristics, it is possible to maintain high image clearness and inhibit the occurrence of glare while improving the problem of the pixel grid visually recognized.

In the present specification, unless otherwise specified, "refractive index" means a refractive index at a wavelength of 550 nm.

Hereinafter, the constituents constituting the light diffraction film according to the embodiment of the present invention will be more specifically described.

<<Transparent Substrate>>

The transparent substrate according to an embodiment of the present invention may be an inorganic material or an organic material. As the transparent substrate, a plastic film formed of a resin having transparency and flexibility is preferably used. The transmittance of the transparent substrate (visible light transmittance) is preferably equal to or higher than 80%, and more preferably equal to or higher than 90%. Examples of suitable plastic films for the transparent substrate include polyester films such as polyethylene terephthalate, polyethylene naphthalate, polyethylene isophthalate, and polybutylene terephthalate, and films formed of a (meth)acrylic resin, a polystyrene-based resin, a polyolefin-based resin, a cyclic polyolefin-based resin, and a cellulose-based resin such as cellulose acylate. The (meth) acrylic resin includes a polymer having a lactone ring structure, a polymer having a glutaric acid anhydride ring structure, and a polymer having a glutarimide ring structure. In addition, other plastic films can also be used as long as they have required strength and optical suitability.

The transparent substrate may or may not have ultraviolet permeability. It is more preferable that the transparent substrate does not have ultraviolet permeability. In a case where the transparent substrate does not have ultraviolet permeability, deterioration of the transparent substrate exposed to sunlight can be reduced.

The film thickness of the transparent substrate is not particularly limited, but is preferably equal to or greater than 10 μm and equal to or smaller than 200 μm, more preferably equal to or greater than 12 μm and equal to or smaller than 100 μm, even more preferably equal to or greater than 15 μm and equal to or smaller than 60 μm, and particularly preferably equal to or greater than 15 μm and equal to or smaller than 50 μm.

The transparent substrate according to the embodiment of the present invention can also be used as a temporary support. The temporary support refers to a support which undergoes a peeling step after the light diffraction layer according to the embodiment of the present invention is formed on the support by coating, such that only the light diffraction layer according to the embodiment of the present invention is transferred to any surface. By transferring only the light diffraction layer, the distance between an image display portion and the light diffraction layer is reduced, and a wearable display device constituted as a thin film can be created.

<<Light Diffraction Layer>>

The light diffraction layer contains a binder resin and particles.

<Binder Resin>

It is preferable that the binder resin has a function of binding particles to the transparent substrate, the light diffraction layer, and a layer other than the light diffraction layer.

The binder resin can be obtained by curing a curable compound.

The curable compound used for forming the binder resin is called curable compound (a1) as well.

<Curable Compound (a1)>

As the curable compound (a1), a compound having a polymerizable functional group (preferably an ionizing radiation-curable compound) is preferable. As the compound having a polymerizable functional group, various monomers, oligomers, or polymers can be used. As the polymerizable functional group (polymerizable group), a photopolymerizable functional group, an electron beam-polymerizable functional group, and a radiation-polymerizable functional group are preferable. Among these, a photopolymerizable functional group is preferable.

Examples of the photopolymerizable functional group include polymerizable unsaturated groups (carbon-carbon unsaturated double bond groups) such as a (meth)acryloyl group, a vinyl group, a styryl group, and an allyl group, and the like. Among these, a (meth)acryloyl group is preferable.

Specific examples of the compound having a polymerizable unsaturated group include (meth)acrylic acid diesters of alkylene glycol such as neopentyl glycol acrylate, 1,6-hexanediol (meth)acrylate, and propylene glycol di(meth)acrylate; (meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate; (meth)acrylic acid diesters of a polyhydric alcohol such as pentaerythritol di(meth)acrylate; (meth)acrylic acid diesters of an ethylene oxide or propylene oxide adduct such as 2,2-bis{4-(acryloxy-diethoxy)phenyl}propane and 2-2-bis{4-(acryloxy-polypropoxy)phenyl}propane; and the like.

Furthermore, epoxy (meth)acrylates, urethane (meth)acrylates, and polyester (meth)acrylates are also preferably used as the compound having a photopolymerizable functional group.

Among these, esters of a polyhydric alcohol and (meth)acrylic acid are preferable. It is more preferable that the curable compound (a1) contains at least one kind of polyfunctional monomer having 3 or more (meth)acryloyl groups in one molecule.

Examples thereof include pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, caprolactone-modified dipentaerythritol hexa(meth)acrylate, 1,2,3-cyclohexane tetramethacrylate, polyurethane polyacrylate, polyester polyacrylate, caprolactone-modified tris(acryloxyethyl)isocyanurate, and the like.

Specifically, examples of the polyfunctional acrylate-based compounds having a (meth)acryloyl group include esterified compounds of polyol and (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303 manufactured by Nippon Kayaku Co., Ltd., and V#3PA, V#400, V#36095D, V#1000, and V#1080 manufactured by OSAKA ORGANIC CHEMICAL INDUSTRY LTD. Furthermore, it is possible to use urethane acrylate compounds having 3 or more functional groups such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by The Nippon Synthetic Chemical Industry Co., Ltd.), UA-306H, UA-3061, UA-306T, and UL-503LN (manufactured by KYOEISHA CHEMICAL Co., LTD), UNIDIC 17-806, UNIDIC 17-813, UNIDIC V-4030, and UNIDIC V-4000BA (manufactured by DIC Corporation), EB-1290K, EB-220, EB-5129. EB-1830, and EB-4858 (manufactured by Daicel-UCB Company, Ltd.), A-TMMT, A-TMPT, U-4HA, U-6HA, U-10HA, and U-15HA (manufactured by SHIN-NAKAMURA CHEMICAL CO., LTD.), HI-COAP AU-2010 and HI-COAP AU-2020 (manufactured by TOKUSHIKI Co., Ltd.). ARONIX M-1960 (manufactured by TOAGOSEI CO., LTD.), ART RESIN UN-3320HA, UN-3320HC, UN-3320HS, UN-904, and HDP-4T, polyester compounds having 3 or more functional groups such as ARONIX M-8100, M-8030, and M-9050 (manufactured by TOAGOSEI CO., LTD.) and KRM-8307 (manufactured by Daicel SciTech), and the like.

Furthermore, examples thereof also include a resin shaving 3 or more polymerizable functional groups such as oligomers, prepolymers, and the like of polyfunctional compounds such as a polyester resin having a relatively low molecular weight, a polyether resin, an acryl resin, an epoxy resin, a urethane resin, an alkyd resin, a spiroacetal resin, a polybutadiene resin, a polythiol polyene resin, or a polyhydric alcohol.

In addition, it is also possible to use the compounds described in JP2005-076005A and JP2005-036105A, the dendrimers such as SIRIUS-501 and SUBARU-501 (manufactured by OSAKA ORGANIC CHEMICAL INDUSTRY LTD.), and the norbornene ring-containing monomers described in JP2005-060425A.

As the curable compound (a1), it is preferable to use at least one kind of polymerizable compound having a refractive index equal to or higher than 1.50 and less than 1.60 after curing. Among the curable compounds (a1), a polymerizable compound having a refractive index equal to or higher than 1.50 and less than 1.60 after curing is called "curable compound (a1M)" as well.

Furthermore, in order to adjust the refractive index of the binder resin, it is preferable to use a polymerizable compound (referred to as "curable compound (a1H)" as well) having a refractive index equal to or higher than 1.60 after curing and the curable compound (a1M) in combination.

Examples of compounds preferred as the polymerizable compound having a refractive index equal to or higher than 1.60 after curing include a fluorene skeleton, a dinaphthothiophene skeleton, a naphthalene skeleton, an anthracene skeleton, a benzotriazole skeleton, a triazine skeleton, a benzophenone skeleton, a merocyanine skeleton, a benzoxazole skeleton, a benzothiol skeleton, a triphenylene skeleton, a cinnamoyl skeleton, a tolan skeleton, and the like. Specific examples thereof include the compounds represented by General Formulae (I) to (VI) described in paragraphs "0029" to "0046" in JP2007-091876A, the fluorene compounds described in paragraphs "0113" to "0115" in JP2014-034596A, the fused ring-containing compound represented by General Formula (1) in JP2014-080572A (preferably the fused ring-containing compound represented by General Formula (3) in JP2014-080572A), the compounds described in paragraph "0016" in JP2013-253161A, the compound described in paragraphs "0025" to "0153" in JP2006-301614A, the compounds described in paragraphs "0020" to "0122" in JP2007-108732A, the compounds described in paragraphs "0012" to "0108" in JP2010-244038A, and the like. Among these, a compound having at least one skeleton selected from the group consisting of a fluorene skeleton, a dinaphthothiophene skeleton, a naphthalene skeleton, and an anthracene skeleton is preferable, and a compound having a fluorene skeleton is more preferable.

A refractive index difference between the binder resin and particles, which will be described later, is a diffraction factor. Therefore, in order to adjust the refractive index difference, it is preferable to use a polymerizable compound having a refractive index less than 1.50 after curing (referred to as "curable compound (a1L)" as well) and the curable compound (a1M) in combination.

Examples of compounds preferred as the polymerizable compound having a refractive index less than 1.50 after curing include the fluorine-containing polyfunctional acrylate monomers described in JP2010-152311A, commercial products such as fluorine-containing acrylate LINCA-3A and LINCA-5A (manufactured by KYOEISHA CHEMICAL Co., LTD), and the like.

In a case where either or both of the polymerizable compound having a refractive index equal to or higher than 1.60 after curing (curable compound (a1H)) and the polymerizable compound having a refractive index less than 1.50 after curing (curable compound (a1L)) are used in combination with the curable compound (a1M) so as to adjust the refractive index difference between the binder resin and the particles, it is preferable that an SP value of a composition for forming a binder resin obtained after mixing either or both of the curable compound (a1H) and the curable compound (a1L) with the curable compound (a1M) is adjusted to be 20 to 24. In a case where the SP value showing hydrophilicity and hydrophobicity of the composition for forming a binder resin obtained after mixing is set to be 20 to 24, the dispersibility of the particles, which will be described later, can be extremely excellent. Particularly, in a case where the transparent substrate is coated with a composition for forming a light diffraction layer containing the composition for forming a binder resin, particles, and a solvent, the dispersibility after the volatilization of the solvent is greatly affected, and accordingly, it is possible to obtain a light diffraction film having high particle regularity and high in-plane uniformity. By appropriately selecting a mixing ratio between either or both of the curable compound (a1H) and the curable compound (a1L) and the curable compound (a1M), the SP value of the composition for forming a binder resin obtained after mixing can be set to be 20 to 24. The SP value changes according to the composition of the particles, surface dispersants, and surface modification. For example, in a case where acryl-modified silica particles are used as particles, the SP value of the composition for forming a binder resin obtained after mixing is more preferably 21 to 23, and even more preferably 21.5 to 22.5.

The SP value of the composition for forming a binder resin is a value determined by squaring the SP value of the curable compound (a1H), the SP value of the curable compound (a1L), and the SP value of the curable compound (a1M) as content rates of these compounds.

The SP value (solubility parameter) in the present invention is a value calculated by the Fedors' method, and the unit thereof is "$MPa^{0.5}$". The Fedors' method is described in TABLE 7.3 in PROPERTIES OF POLYMERS.

In order to adjust the refractive index of the binder resin and to inhibit curls and surface asperities, it is preferable to use inorganic fine particles, which do not undergo cure shrinkage and have a particle diameter equal to or smaller than 50 nm, in combination. For example, $ZrO_2$ particles (refractive index: 1.9) can be used for increasing the refractive index, or silica particles (refractive index: 1.46) or hollow silica particles (refractive index: 1.35) can be used for reducing the refractive index. Examples of commercial inorganic fine particles include ZR-30BFN ($ZrO_2$ particles having a particle diameter of 15 nm), MEK-AC-2140Z (silica particles having a particle diameter of 15 nm), MEK-AC-4130Y (silica particles having a particle diameter of 45 nm), (all manufactured by NISSAN CHEMICAL INDUSTRIES, LTD.), and the like. In a case where the refractive index is adjusted by using inorganic fine particles in combination, it is preferable to use 2 or more kinds of curable compounds having different hydrophilicity and hydrophobicity such that the SP value of the composition for forming a binder resin obtained after mixing is adjusted to be 20 to 24.

<Particles>

Examples of particles that can be used for forming the light diffraction layer include resin particles and inorganic fine particles. Specifically, examples of particles preferred as the resin particles include resin particles such as cross-linked polymethyl methacrylate particles, cross-linked methyl methacrylate-styrene copolymer particles, cross-linked polystyrene particles, cross-linked methyl methacrylate-methyl acrylate copolymer particles, crosslinked acrylate-styrene copolymer particles, melamine-formaldehyde resin particles, and benzoguanamine.formaldehyde resin particles. Among these, cross-linked styrene particles, cross-linked polymethyl methacrylate particles, cross-linked methyl methacrylate-styrene copolymer particles, and the like are preferable. Examples of particles preferred as the resin particles also include so-called surface modified particles, which are obtained by chemically bonding compounds containing a fluorine atom, a silicon atom, a carboxyl group, a hydroxyl group, an amino group, a sulfonic acid group, a phosphoric acid group, and the like to the surface of the resin particles exemplified above, and particles containing nanosized inorganic fine particles such as silica or zirconia bonded to the surface thereof. Furthermore, as particles, inorganic fine particles can also be used. Specific examples of particles preferred as the inorganic fine particles include silica particles, alumina particles, and the like. Among these, silica particles are particularly preferably used.

Any of perfectly spherical and amorphous particles can be used.

(Average Primary Particle Diameter)

The average primary particle diameter of the particles is equal to or greater than 1 μm and equal to or smaller than 10 μm, preferably equal to or greater than 2 μm and equal to or smaller than 8 μm, and more preferably equal to or greater than 3 μm and equal to or smaller than 5 μm. In a case where the average primary particle diameter is equal to or smaller than 10 μm, it is possible to increase the light diffraction angle at the time of allowing light to be incident on the light diffraction film from the front. Accordingly, in a case where the light diffraction film according to the embodiment of the present invention is applied to a wearable display device so as to solve the problem of the pixel grid visually recognized, the distance between the pixel of an image display portion and the light diffraction layer can be reduced, which consequently can contribute to thinning and lightweighting of the image display portion. In a wearable display, lightweighting is considered as an important issue. In a case where the average primary particle diameter is equal to or greater than 1 μm, it is possible to obtain a light diffraction efficiency required for solving the problem of visibility of the pixel grid.

The average primary particle diameter of fine particles refers to a particle diameter at 50% in the cumulative distribution of a volume-average particle diameter. For measuring the particle diameter, a Scanning Electron Microscope (SEM) can be used. By observing powder particles (in the case of dispersion liquid, particles remaining after the dispersion liquid is dried to volatilize a solvent) with SEM at an appropriate magnification (about 5,000×), measuring the diameter of each of 100 primary particles, and calculating the volume of the particles, a particle diameter at 50% in the cumulative distribution can be adopted as the average primary particle diameter. In a case where the particles are not spherical, the average of major axes and minor axes is regarded as the diameter of primary particles. In a case where particles contained in the light diffraction film are measured, the average primary particle diameter is calculated by observing the light diffraction film with SEM as described above from the surface side thereof. At this time, in order to facilitate observation, carbon vapor deposition, an etching treatment, and the like may be appropriately performed on a sample.

It is desirable that the primary particle diameter of the particles is uniform. A Cv value (coefficient variation) is preferably less than 7%, more preferably less than 5%, and even more preferably less than 3%. In a case where the Cv value is less than 7%, the particle diameter is uniform. Accordingly, the surface asperities formed by the particles become uniform as well, unevenness (so-called glare) in pixel display hardly occurs, and visibility can be improved.

The particles are arranged in an in-plane direction of the light diffraction layer, and a particle regularity thereof is preferably equal to or higher than 30%, more preferably equal to or higher than 35%, and even more preferably equal to or higher than 40%. "Particle regularity" is a parameter showing how different an inter-particle distance is from a distance (regular arrangement distance $Li$) in a case where the particles are periodically arranged. The value of the particle regularity is obtained as a ratio between an inter-particle space and a distance between nearest particles that is determined in a case where the particles are periodically arranged. Provided that the number of the particles in a range of 100 μm×100 μm is $Np$, the average primary particle diameter of the particles is $Dp$ μm, and the distance between nearest particles is $Lp$ μm, the particle regularity is determined by the following equation.

Regular arrangement distance $Li = (4/\sqrt{3} \times 10,000/2/Np)^{(1/2)}$

Particle regularity $= (Lp-Dp)/(Li-Dp)$

Provided that a refractive index of the particles is $np$ and a refractive index of the binder resin is $nb$, a refractive index ratio $nb/np$ between the particles and the binder resin is preferably equal to or higher than 1.03 and equal to or lower than 1.09, $nb/np$ is more preferably equal to or higher than 1.04 and equal to or lower than 1.08 and even more preferably equal to or higher than 1.04 and equal to or lower than 1.08, and even more preferably equal to or higher than 1.05 and equal to or lower than 1.07.

In addition, $\Delta n = nb-np$ is preferably equal to or greater than 0.01 and equal to or smaller than 0.1, more preferably equal to or greater than 0.02 and equal to or smaller than 0.08, and even more preferably equal to or greater than 0.03 and equal to or smaller than 0.05. In a case where the refractive index $np$ of the particles is higher than the refractive index $nb$ of the binder resin, $np$ and $nb$ may be read by being switched.

In the light diffraction layer of the light diffraction film according to the embodiment of the present invention, the film thickness of the binder resin (referred to as "binder resin height" as well; for example, a height h of the binder resin in FIG. 1) is preferably equal to or greater than 70% and equal to or smaller than 300% of the average primary particle diameter of the particles. The height h is more preferably equal to or greater than 80% and equal to or smaller than 20% of the average primary particle diameter of the particles, and even more preferably equal to or greater than 90% and equal to or smaller than 150% of the average primary particle diameter of the particles. In a case where the height h of the binder resin is equal to or greater than 70% of the average primary particle diameter of the particles, scattering caused by the interface between the particles and air due to the refractive index difference does not excessively occur, and the film hardly whitens. In a case where the height h of the binder resin is equal to or smaller than 300% of the average primary particle diameter of the particles, it is difficult for a plurality of particles to be present in a direction orthogonal to the surface of the transparent substrate in the light diffraction layer (that is, the particles are hardly superposed in the film thickness direction, in other words, particles are hardly layered), multiple scattering hardly occurs, and whitening of the film is inhibited.

[Manufacturing Method of Light Diffraction Film]

The manufacturing method of the light diffraction film according to the embodiment of the present invention is not particularly limited. Examples of an aspect of preferred manufacturing methods include a manufacturing method including the following first and second steps performed in this order.

<<First Step>>

The first step is a step of providing a first layer, which contains a curable compound for forming a binder resin and particles, on a transparent substrate.

In the first step, the method for providing the first layer on the transparent substrate is not particularly limited. It is preferable to provide the first layer by coating transparent substrate with the first layer. In this case, the first layer is a layer formed by coating the transparent substrate with a composition containing a curable compound and particles. As the coating method, known methods can be used without particular limitation. Examples thereof include a dip coating method, an air knife coating method, a curtain coating method, a roller coating method, a wire bar coating method, a gravure coating method, a die coating method, and the like.

At the end of the first step, it is preferable that the number of particles present in a direction orthogonal to the surface of the transparent substrate is not plural. "Number of particles present in a direction orthogonal to the surface of the transparent substrate is not plural" means that in a case where a range of 100 μm×100 μm in the plane of the transparent substrate is observed with a scanning electron microscope (SEM) in 3 fields of view, the proportion of the number of particles present without being superposed as a plurality of particles along a direction orthogonal to the surface is equal to or higher than 80%. The proportion is more preferably equal to or higher than 88%, and even more preferably equal to or higher than 95%.

<Composition for Forming First Layer>

It is preferable that the first layer is formed by coating the transparent substrate with a curable composition containing a curable compound and particles (composition for forming a first layer). The composition for forming a first layer may contain components other than the curable compound and the particles. For example, the composition for forming a first layer may contain a solvent, a polymerization initiator, a particle dispersant, a leveling agent, an antifouling agent, and the like.

The curable compound will not be described because it is the same as the compound for forming a binder resin used for forming the binder resin contained in the light diffraction layer of the light diffraction film described above.

Furthermore, the particles will not be described because they are the same as the particles contained in the light diffraction layer of the light diffraction film described above.

(Solvent)

As the solvent, from the viewpoint of improving dispersibility, it is preferable to select a solvent having polarity close to that of the particles. Specifically, for example, in a case where metal oxide particles are used as the particles, an alcohol-based solvent is preferable. Examples thereof include methanol, ethanol, 2-propanol, 1-propanol, butanol, and the like. Furthermore, for example, in a case where metal resin particles constituted with fine particles having undergone a hydrophobic surface modification are used, a solvent such as a ketone-based solvent, an ester-based solvent, a carbonate-based solvent, alkane, and an aromatic solvent are preferable. Examples thereof include methyl ethyl ketone (MEK), dimethyl carbonate, methyl acetate, acetone, methylene chloride, cyclohexanone, and the like. As long as the dispersibility does not markedly deteriorate, a plurality of kinds of these solvents may be used by being mixed together.

(Particle Dispersant)

In the present invention, a particle dispersant may be used.

By reducing cohesive force between particles, the particle dispersant makes it easy for the particles to be uniformly arranged. The dispersant is not particularly limited. As the dispersant, an anionic compound such as sulfate or phosphate, a cationic compound such as an aliphatic amine salt or a quaternary ammonium salt; a nonionic compound, and a polymer compound are preferable, and a polymer compound is more preferable because this compound makes it possible to more freely select an adsorptive group and a steric repulsion group. As the dispersant, commercial products can also be used.

Specific examples of the polymer dispersant are described in paragraphs "0065" to "0070" in Japanese Patent No. 5909454.

(Leveling Agent)

By reducing the surface tension of the first layer, the leveling agent stabilizes the applied liquid. In this way, the leveling agent makes it easy for the curable compound and the particles to be uniformly arranged.

The composition for forming a first layer used in the present invention can contain at least one kind of leveling agent.

In this way, it is possible to inhibit film thickness unevenness resulting from uneven drying caused by local distribution of dry air, to improve cissing of the applied material, and to facilitate the uniform arrangement of the curable compound and the particles.

Specifically, as the leveling agent, it is possible to use at least one kind of compound selected from a silicone-based leveling agent and a fluorine-based leveling agent. As the leveling agent, an oligomer or a polymer is more preferred than a low-molecular-weight compound.

In a case where the leveling agent is added, the leveling agent rapidly moves to and is localized in the surface of the coating film formed by coating, and even after the coating film is dried, the leveling agent remains localized in the surface as it is. Accordingly, by the leveling agent, the surface energy of the film to which the leveling agent is added is reduced. From the viewpoint of preventing film thickness unevenness, cissing, and unevenness, it is preferable that the surface energy of the film is low.

Examples of compounds preferred as the silicone-based leveling agent include a polymer or an oligomer which contains a plurality of dimethylsilyloxy units as repeating units and has a substituent on a terminal and/or a side chain. The polymer or the oligomer containing dimethylsilyloxy as a repeating unit may contain a structural unit other than the dimethylsilyloxy. It is preferable that the polymer or the oligomer has a plurality of substituents which may be the same as or different from each other. Examples of preferred substituents include groups containing a polyether group, an alkyl group, an aryl group, an aryloxy group, a cinnamoyl group, an oxetanyl group, a fluoroalkyl group, a polyoxyalkylene group, and the like.

The number-average molecular weight of the silicone-based leveling agent is not particularly limited, but is preferably equal to or smaller than 100,000, more preferably equal to or smaller than 50,000, particularly preferably 1,000 to 30,000, and most preferably 1,000 to 20,000.

The content of the leveling agent with respect to the total solid content in the composition for forming a first layer is preferably 0.01% to 5.0% by mass, more preferably 0.01% to 2.0% by mass, and most preferably 0.01% to 1.0% by mass.

The fluorine-based leveling agent is a compound having a fluoroaliphatic group and an amphiphilic group, which contributes to the affinity with various compositions for coating, molding materials, and the like in a case where the leveling agent is used as an additive for example, in the same molecule. Generally, this compound can be obtained by copolymerizing a monomer having a fluoroaliphatic group and a monomer having an amphiphilic group.

Typical examples of the monomer having an amphiphilic group that is copolymerized with the monomer having a fluoroaliphatic group include poly(oxyalkylene)acrylate, poly(oxyalkylene)methacrylate, and the like.

As the fluorine-based leveling agent, it is also possible to use the compounds described in JP2004-331812A and JP2004-163610A, and the like.

In a case where the light diffraction film according to the embodiment of the present invention is used in an image display device comprising a touch panel, sometimes an Optical Clear Adhesive (OCA) is laminated on the light diffraction layer according to the embodiment of the present invention, or the light diffraction layer according to the embodiment of the present invention is coated with an Optical Clear Resin (OCR). In this case, in order to obtain wettability or adhesiveness, it is preferable to use the fluorine-containing polymer described in JP2016-090722A having a polarity converting group which obtains enhanced hydrophilicity by being hydrolyzed by the action of an alkali solution.

(Antifouling Agent)

For the purpose of imparting properties such as antifouling properties, waterproofness, chemical resistance, and lubricity to the first layer, a known silicone-based or fluorine-based antifouling agent, a lubricant, and the like can be appropriately added to the first layer.

Specifically, as the silicone-based or fluorine-based antifouling agent, among the silicone-based or fluorine-based leveling agents described above, for example, those having an ionizing radiation-curable group can be suitably used. However, the present invention is not limited thereto.

The content of the antifouling agent with respect to the total solid content in the first layer is preferably 0.01% to 5.0% by mass, more preferably 0.01% to 2.0% by mass, and most preferably 0.01% to 1.0% by mass.

(Polymerization Initiator)

As the polymerization initiator, a photopolymerization initiator is preferable.

Examples of the photopolymerization initiator include acetophenones, benzoins, benzophenones, phosphine oxides, ketals, anthraquinones, thioxanthones, azo compounds, peroxides, 2,3-dialkyl dione compounds, disulfide compounds, fluoroamine compounds, aromatic sulfoniums, lophine dimers, onium salts, borate salts, active esters, active halogens, inorganic complexes, coumarins, and the like. Specific examples, preferred aspects, and commercial products of the photopolymerization initiator are described in paragraphs "0133" to "0151" in JP2009-098658A, and can be suitably used in the present invention as well.

Examples of various photopolymerization initiators are also described in "Latest UV Curing Technique" {TECHNICAL INFORMATION INSTITUTE CO., LTD} (1991), p. 159 and "Ultraviolet Curing System", Kiyomi Kato (1989, SOGOKIDUTU CENTER), p. 65-148. These are useful for the present invention.

The content of the polymerization initiator in the first layer is set to be an amount that is sufficient for polymerizing polymerizable compounds contained in the first layer and prevents the number of initiation points from increasing too much. For this reason, the content of the polymerization initiator with respect to the total solid content in the first layer is preferably 0.1% to 8% by mass, and more preferably 0.5% to 5% by mass.

<<Second Step>>

The second step is a step of curing the first layer provided by coating in the first step.

Curing the first layer means that the curable compound contained in the first layer is polymerized. By the curing, the binder resin in the light diffraction layer of the finished light diffraction film can be formed.

The first layer can be cured by being irradiated with ionizing radiation. The type of the ionizing radiation is not particularly limited, and examples thereof include X-rays, electron beams, ultraviolet rays, visible light, infrared rays, and the like. Among these, ultraviolet rays are widely used. For example, in a case where the coating film can be cured by ultraviolet rays, it is preferable to irradiate the first layer with ultraviolet rays from an ultraviolet lamp in an irradiation amount of 10 mJ/cm$^2$ to 1,000 mJ/cm$^2$ such that the curable compound in the first layer is cured. The irradiation amount is more preferably 50 mJ/cm$^2$ to 1,000 mJ/cm$^2$, and even more preferably 100 mJ/cm$^2$ to 500 mJ/cm$^2$. At the time of irradiation, the entirety of the energy described above can be radiated to the first layer at a time, or the energy described above can be radiated to the first layer in divided portions. Regarding the type of the ultraviolet lamp, a metal halide lamp, a high-pressure mercury lamp, and the like are suitably used.

At the time of curing, the oxygen concentration is preferably 0% to 1.0% by volume, more preferably 0% to 0.1% by volume, and most preferably 0% to 0.05% by volume. In a case where the oxygen concentration at the time of curing is set to be equal to or lower than 1.0% by volume, the first layer is hardly affected by the curing inhibition caused by oxygen and becomes a firm film.

At the start of the second step, it is preferable that the number of particles present in a direction orthogonal to the surface of the transparent substrate is not plural.

The same particles as those described above can be used as particles. Particularly, the particles are preferably inorganic particles, and more preferably particles having undergone a surface treatment so as to improve the dispersibility in a coating solution, improve the film hardness, and prevent aggregation. Specific examples of the surface treatment method and preferred examples thereof are the same as those described in paragraphs "0119" to "0147" in JP2007-298974A.

Particularly, from the viewpoint of imparting binding properties with a binder component and improving the film hardness, it is preferable to impart an unsaturated double bond to the surface of the particles by modifying the surface of the particles with a compound which has an unsaturated double bond and a functional group reactive with the surface of the particles. It is more preferable to impart a (meth)acryloyl group to the surface of the particles.

<Head-Mounted Display (HMD)>

A head-mounted display includes an image display portion and a lens portion. The light diffraction film according to the embodiment of the present invention can be installed in any position in a region ranging from the image display portion to the lens portion. It is preferable that the light diffraction film is disposed on the surface of the image display portion because then the light diffraction film can be designed without increasing the diffraction angle. The image display portion may adopt any display method. For example, the present invention can be designed for any of methods such as liquid crystal display (LCD), an organic light-emitting diode (OLED), and a micro-light emitting diode (LED). In a case where the image display portion is an OLED panel, in order to reduce reflection occurring in a substrate, a polarizing plate comprising a λ/4 plate is installed on the surface of the image display portion in many cases. It is also preferable to use the light diffraction film according to the embodiment of the present invention as a film on the inside of the polarizing plate.

The image display portion of HMD can be used in combination with a smart phone. In a case where a smart phone is attached to an HMD attachment, it is preferable that the light diffraction film according to the embodiment of the present invention is disposed on the surface of a panel for the smart phone, that is, on the inside of a touch panel portion. In this case, in order to reduce the reflection occurring on the surface of the light diffraction film according to the embodiment of the present invention, an antireflection layer is laminated or an air gap is removed using OCA. In this way, the reflection of extraneous light that occurs in a case where the light diffraction film is used for a smart phone is reduced, which is preferred because visibility does not deteriorate.

EXAMPLES

Hereinafter, examples of the present invention will be described, but the present invention is not limited to the following examples.

[Preparation of Composition for Forming Light Diffraction Layer]

Components were put into a mixing tank according to the composition shown in Table 1, stirred for 60 minutes, and dispersed with an ultrasound dispersion machine for 30 minutes, thereby preparing compositions for forming a light diffraction layer (DC1 to DC13 and DC1R to DC3R).

TABLE 1

| Composition for forming light diffraction layer | Type of particles | Amount of particles added [part by mass] | SIRIUS-501 [part by mass] | EA-0200 [part by mass] | IRGACURE 127 [part by mass] | Ethanol [part by mass] | MEK [part by mass] | Acetone [part by mass] |
|---|---|---|---|---|---|---|---|---|
| DC1 | SSX-104 | 9.6 | 6.7 | 5.0 | 0.1 | 14.7 | 49.1 | 14.7 |
| DC2 | SSX-104 | 8.4 | 7.7 | 5.8 | 0.1 | 14.7 | 48.6 | 14.7 |
| DC1R | SSX-104 | 7.2 | 8.6 | 6.5 | 0.1 | 14.7 | 48.1 | 14.7 |
| DC3 | SSX-104 | 10.8 | 5.8 | 4.3 | 0.1 | 14.7 | 49.5 | 14.7 |
| DC2R | SSX-104 | 11.4 | 5.3 | 4.0 | 0.1 | 14.7 | 49.8 | 14.7 |
| DC4 | SSX-101 | 9.6 | 6.7 | 5.0 | 0.1 | 14.7 | 49.1 | 14.7 |
| DC5 | SSX-108 | 9.6 | 6.7 | 5.0 | 0.1 | 14.7 | 49.1 | 14.7 |
| DC3R | SSX-115 | 9.6 | 6.7 | 5.0 | 0.1 | 14.7 | 49.1 | 14.7 |
| DC6 | SSX-104 | 9.6 | 11.8 | 2.5 | 0.1 | 14.7 | 46.5 | 14.7 |
| DC7 | SSX-104 | 9.6 | 16.8 | 0.0 | 0.1 | 14.7 | 44.0 | 14.7 |
| DC8 | SSX-104 | 9.6 | 0.0 | 8.4 | 0.1 | 14.7 | 52.4 | 14.7 |
| DC9 | SSX-108 | 9.6 | 13.4 | 1.7 | 0.1 | 14.7 | 45.7 | 14.7 |
| DC10 | 3DS | 9.6 | 13.4 | 1.7 | 0.1 | 14.7 | 45.7 | 14.7 |
| DC11 | N3N | 9.6 | 16.8 | — | 0.1 | 14.7 | 44.0 | 14.7 |
| DC12 | SSX-104 | 10.8 | 4.1 | 3.0 | 0.1 | 14.7 | 52.5 | 14.7 |
| DC13 | SSX-104 | 10.8 | 11.6 | 8.6 | 0.2 | 14.7 | 39.3 | 14.7 |

The used compounds are as below.
SIRIUS-501: dendrimer (manufactured by OSAKA ORGANIC CHEMICAL INDUSTRY LTD., SIRIUS-501, solid contents: 50%, SP value: 22)
EA-0200; acrylate monomer (manufactured by Osaka Gas Chemicals Co., Ltd., EA-0200, SP value: 23.4)
IRGACURE 127: photopolymerization initiator (manufactured by BASF Japan Ltd.)
SSX-101: 1 μm perfectly spherical particles of cross-linked polymethyl methacrylate (TECHPOLYMER manufactured by SEKISUI PLASTICS CO., LTD., SSX-101)
SSX-104: 4 μm perfectly spherical particles of cross-linked polymethyl methacrylate (TECHPOLYMER manufactured by SEKISUI PLASTICS CO., LTD., SSX-104)
SSX-108: 8 μm perfectly spherical particles of cross-linked polymethyl methacrylate (TECHPOLYMER manufactured by SEKISUI PLASTICS CO., LTD., SSX-108, Cv value: 6.5%)
SSX-115: 15 μm perfectly spherical particles of cross-linked polymethyl methacrylate (TECHPOLYMER manufactured by SEKISUI PLASTICS CO., LTD., SSX-115)
3DS: 8 μm perfectly spherical particles of cross-linked polymethyl methacrylate (HAYAKAWA CHEMICAL INDUSTRIES CO., LTD., HAYABEADS 3DS, Cv value: 4%)
N3N: 8 μm perfectly spherical particles of silica (UBE EXSYMO CO., LTD., HIPRESICA N3N, Cv value: 1.5%)

<Preparation of Light Diffraction Film>

Examples 1 to 8, 14, and 15 and Comparative Examples 1 to 3

(First Step: Forming First Layer by Coating)

By using a die coater, a transparent substrate (FUJITAC TD60UL (manufactured by FUJIFILM Corporation), thickness: 60 μm) was coated with each of the compositions for forming a first layer (compositions for forming a light diffraction layer (DC1 to DC8, DC12, DC13, and DC1R to DC3R)) by adjusting the coating amount such that the thickness after drying (height of the binder resin) became the thickness described in Table 2. The applied composition was dried for 5 minutes at 80° C. In this way, a first layer was formed by coating.

(Second Step: Curing of First Layer)

After the drying described above, nitrogen purging was performed to create an atmosphere with an oxygen concentration equal to or lower than 0.01% by volume. While the nitrogen purging was being performed, by using a 160 W/cm air-cooled metal halide lamp (manufactured by EYE GRAPHICS Co., Ltd.), the substrate was irradiated with ultraviolet rays at an illuminance of 200 mW/cm$^2$ and an irradiation amount of 300 mJ/cm$^2$ from the surface coated with the first layer such that the first layer was cured, thereby forming a light diffraction layer.

Example 9

A light diffraction film was prepared in the same manner as in Example 1, except that the transparent substrate was changed to FUJITAC TJ25 (manufactured by FUJIFILM Corporation, thickness: 25 μm).

Examples 10 to 13

Light diffraction films were prepared in the same manner as in Example 1, except that the transparent substrate was changed to FUJITAC TG40 (manufactured by FUJIFILM Corporation, thickness: 40 μm), and the compositions for forming a first layer (compositions for forming a light diffraction layer) described in Table 2 were used.

<Method for Measuring Coverage>

The coverage of a surface of the transparent substrate covered with particles can be measured by observing a cross section thereof with SEM. A sample of the light diffraction film is cut with a microtome such that the cross section thereof is exposed, and the cross section is observed with SEM at appropriate magnification (about 5,000×). In order to facilitate observation, an appropriate treatment such as carbon vapor deposition or etching may be performed on the sample. Provided that the number of the particles in a range of 100 μm×100 μm is Np and an average primary particle diameter of the particles is Dp μm, the coverage is determined by the following equation.

Coverage=π×$Np$×($Dp$/2)^2/10,000×100[%]

The number of particles can be measured by observing the surface of the light diffraction film with SEM. In order to facilitate observation, an appropriate treatment such as carbon vapor deposition or etching may be performed on the sample. An appropriate magnification (about 100×) is selected, and a range of 100 μm×100 μm is observed with SEM. By detecting location coordinates of all the particles positioned on the uppermost surface side observed with SEM, the number of particles per unit area can be determined.

<Method for Measuring Height h of Binder Resin>

The height h of the binder resin can be measured by observing a cross section of a sample having undergone cross-section cutting with SEM. As the height h of the binder resin, the height of a portion corresponding to the height h in FIG. 1 was measured.

[Method for Evaluating Light Diffraction Film]

The light diffraction film was evaluated by the following method.

PLAYSTATION VR manufactured by Sony Interactive Entertainment Inc. was disassembled, a sheet (microlens array) stuck to a display portion thereof was removed, and then each of the light diffraction films prepared as above was stuck to the display portion. At this time, a surface of the light diffraction film opposite to the light diffraction layer (surface of the transparent substrate) was stuck to the display portion through a pressure sensitive adhesive. PLAYSTATION VR was then reassembled and caused to display an image, the image was observed through a lens and evaluated in terms of the following 3 items.

<Visibility of Pixel Grid>

A solid white image was displayed on the image display portion, the pixel grid was observed with eyes and graded based on four scales shown below. It is preferable that the pixel grid is not visually recognized.

A: The grid was not visually recognized.
B: The grid was slightly visually recognized.
C: Although the grid was visually recognized, the visibility of the grid was in an acceptable range.
D: The grid was clearly visually recognized.

<Image Clearness>

A white line (one pixel line) with a background of black was displayed on the image display portion, a degree of blurriness of the white line was observed with eyes and graded based on four scales shown below.

A: The white line did not appear blurry.
B: The white line appeared slightly blurry.
C: Although the white line appeared blurry, the blurriness was in an acceptable range.
D: The white line was noticeably blurry.

<Glare>

A solid white image was displayed on the image display portion, and glare was observed with eyes and graded based on four scales shown below.

A: No glare was checked.
B: Slight glare was checked.
C: Although glare was checked, the glare was in an acceptable range.
D: Glare was noticeable.

The constitutions and the evaluation results of the light diffraction films are shown in Table 2.

TABLE 2

| | | Light diffraction layer | | | | |
| --- | --- | --- | --- | --- | --- | --- |
| | | | Particles | | | |
| | Transparent substrate | Composition for forming light diffraction layer | Type of particles | Average primary particle diameter [μm] | Refractive index of particles | Coverage [%] |
| Example 1 | TD60UL | DC1 | SSX-104 | 4 | 1.49 | 80 |
| Example 2 | TD60UL | DC2 | SSX-104 | 4 | 1.49 | 70 |

TABLE 2-continued

| | | | | | | |
|---|---|---|---|---|---|---|
| Comparative Example 1 | TD60UL | DC1R | SSX-104 | 4 | 1.49 | 60 |
| Example 3 | TD60UL | DC3 | SSX-104 | 4 | 1.49 | 90 |
| Comparative Example 2 | TD60UL | DC2R | SSX-104 | 4 | 1.49 | 95 |
| Example 4 | TD60UL | DC4 | SSX-101 | 1 | 1.49 | 80 |
| Example 5 | TD60UL | DC5 | SSX-108 | 8 | 1.49 | 80 |
| Comparative Example 3 | TD60UL | DC3R | SSX-115 | 15 | 1.49 | 80 |
| Example 6 | TD60UL | DC6 | SSX-104 | 4 | 1.49 | 80 |
| Example 7 | TD60UL | DC7 | SSX-104 | 4 | 1.49 | 80 |
| Example 8 | TD60UL | DC8 | SSX-104 | 4 | 1.49 | 80 |
| Example 9 | TJ25 | DC1 | SSX-104 | 4 | 1.49 | 80 |
| Example 10 | TG40 | DC1 | SSX-104 | 4 | 1.49 | 80 |
| Example 11 | TG40 | DC9 | SSX-108 | 8 | 1.49 | 80 |
| Example 12 | TG40 | DC10 | 3DS | 8 | 1.49 | 80 |
| Example 13 | TG40 | DC11 | N3N | 8 | 1.46 | 80 |
| Example 14 | TD60UL | DC12 | SSX-104 | 4 | 1.49 | 90 |
| Example 15 | TD60UL | DC13 | SSX-104 | 4 | 1.49 | 90 |

| | Light diffraction layer | | | Evaluation | | |
|---|---|---|---|---|---|---|
| | | Binder resin | | | | |
| | Particle regularity [%] | Refractive index of binder resin | Height of binder resin [μm] | Visibility of pixel grid | Image clearness | Glare |
| Example 1 | 40 | 1.58 | 4 | A | B | B |
| Example 2 | 32 | 1.58 | 4 | B | B | B |
| Comparative Example 1 | 25 | 1.58 | 4 | D | B | C |
| Example 3 | 60 | 1.58 | 4 | A | A | A |
| Comparative Example 2 | 60 | 1.58 | 8 | A | B | D |
| Example 4 | 50 | 1.58 | 1 | B | C | A |
| Example 5 | 35 | 1.58 | 8 | A | C | C |
| Comparative Example 3 | 32 | 1.58 | 15 | D | A | C |
| Example 6 | 40 | 1.55 | 4 | B | A | B |
| Example 7 | 40 | 1.52 | 4 | C | A | B |
| Example 8 | 40 | 1.62 | 4 | A | C | B |
| Example 9 | 40 | 1.58 | 4 | A | B | B |
| Example 10 | 40 | 1.58 | 4 | A | B | B |
| Example 11 | 35 | 1.54 | 8 | A | B | C |
| Example 12 | 40 | 1.54 | 8 | A | B | B |
| Example 13 | 45 | 1.52 | 8 | A | B | A |
| Example 14 | 55 | 1.58 | 2.8 | A | B | B |
| Example 15 | 50 | 1.58 | 8 | B | C | C |

In all of the examples and the comparative examples except for Example 15, the number of particles present in the light diffraction layer along a direction orthogonal to the surface of the transparent substrate was not plural. In Example 15, it was confirmed that two or more particles were layered in the light diffraction layer along a direction orthogonal to the surface of the transparent substrate.

From the results shown in Table 2, it is understood that the light diffraction film according to the embodiment of the present invention improves the problem of a pixel grid visually recognized and improves image clearness and glare.

Example 2-1

PLAYSTATION VR manufactured by Sony Interactive Entertainment Inc. was disassembled, a sheet (microlens array) stuck to a display portion thereof was removed, and then the light diffraction film of Example 1 was stuck to the display portion. At this time, a surface of the light diffraction film opposite to the light diffraction layer was stuck to the display portion through a pressure sensitive adhesive. PLAYSTATION VR was then reassembled and caused to display an image, and the image was watched. As a result, it was confirmed that the problem of the pixel grid visually recognized was improved, and image clearness and glare were also excellent.

According to the present invention, it is possible to provide a light diffraction film, which prevents a pixel grid from being easily visually recognized even in a wearable display using a magnifying optical system, brings about high image clearness, and hardly causes glare, and a wearable display device.

Hitherto, the present invention has been specifically described with reference to specific embodiments. To those skilled in the art, it is evident that the present invention can be modified or amended in various ways as long as the gist and scope of the present invention are maintained.

EXPLANATION OF REFERENCES

10: light diffraction film
11: transparent substrate
12: light diffraction layer
13: particle
14: binder resin
20: light diffraction film 12': light diffraction layer
13': particle
14': binder resin
30: light diffraction film
15: microlens array

What is claimed is:

1. A light diffraction film comprising:
a transparent substrate; and
a light diffraction layer containing a binder resin and particles,
wherein an average primary particle diameter of the particles is 1 μm to 10 μm, a coverage of a surface of the transparent substrate covered with the particles is 70% to 90%,
the particles are arranged in an in-plane direction of the light diffraction layer, and
provided that the number of the particles in a range of 100 μm×100 μm is Np, an average primary particle diameter of the particles is Dp μm, and a distance between nearest particles is Lp μm, a particle regularity represented by the following equation is equal to or higher than 30%

Regular arrangement distance $Li=(4/\sqrt{3}\times 10{,}000/2/Np)^{(1/2)}$

Particle regularity$=(Lp-Dp)/(Li-Dp)$.

2. The light diffraction film according to claim 1,
wherein in the light diffraction layer, the number of the particles present in a direction orthogonal to the surface of the transparent substrate is not plural.

3. The light diffraction film according to claim 2,
wherein provided that a refractive index of the particles is np and a refractive index of the binder resin is nb, a refractive index ratio nb/np is equal to or higher than 1.03 and equal to or lower than 1.09.

4. The light diffraction film according to claim 2,
wherein a height h of the binder resin is equal to or greater than 70% and equal to or smaller than 300% of the average primary particle diameter of the particles.

5. A wearable display device comprising the light diffraction film according to claim 2.

6. The wearable display device according to claim 5 further comprising:
a display; and
a lens.

7. The wearable display device according to claim 5 further comprising:
a display; and
a diffractive optical element.

8. The light diffraction film according to claim 2,
wherein a height h of the binder resin is equal to or greater than 100% and equal to or smaller than 300% of the average primary particle diameter of the particles.

9. The light diffraction film according to claim 1, wherein provided that a refractive index of the particles is np and a refractive index of the binder resin is nb, a refractive index ratio nb/np is equal to or higher than 1.03 and equal to or lower than 1.09.

10. The light diffraction film according to claim 1,
wherein a height h of the binder resin is equal to or greater than 70% and equal to or smaller than 300% of the average primary particle diameter of the particles.

11. A wearable display device comprising the light diffraction film according to claim 1.

12. The wearable display device according to claim 11 further comprising:
a display; and
a lens.

13. The wearable display device according to claim 11 further comprising:
a display; and
a diffractive optical element.

14. The light diffraction film according to claim 1,
wherein a height h of the binder resin is equal to or greater than 100% and equal to or smaller than 300% of the average primary particle diameter of the particles.

* * * * *